STEREOPHONIC SIGNAL TRANSMISSION SYSTEM

Filed Feb. 5, 1960 2 Sheets-Sheet 1

INVENTOR
FRANCIS R. HOLT
BY Eugene M. Whitacre
ATTORNEY

Sept. 8, 1964 F. R. HOLT 3,148,342

STEREOPHONIC SIGNAL TRANSMISSION SYSTEM

Filed Feb. 5, 1960 2 Sheets-Sheet 2

INVENTOR.
FRANCIS R. HOLT
BY
Eugene M. Whitacre
ATTORNEY

United States Patent Office 3,148,342
Patented Sept. 8, 1964

3,148,342

STEREOPHONIC SIGNAL TRANSMISSION SYSTEM

Francis Raymond Holt, Willow Grove, Pa., assignor to Radio Corporation of America, a corporation of Delaware Filed Feb. 5, 1960, Ser. No. 6,895
9 Claims. (Cl. 332—17)

This invention relates to electronic apparatus for generating the voltage function $$\frac{1}{1+X}$$

from the voltage function X. It has particular application in stereophonic radio transmission apparatus for the generation of the angle modulating signal described in a copending application filed for Jack Avins on October 7, 1959, Serial No. 844,940, now issued as United States Letters Patent 3,068,475, and entitled "Stereophonic Sound Signalling System."

In the above mentioned Avins application, a stereophonic transmission and reception system is described wherein the $(A+B)$ signal (the so-called summation signal of a pair of signals A and B which produce a stereophonic effect when reproduced) is employed to amplitude modulate the transmitted carrier wave, and a signal proportional to $(A-B)$ (the so-called difference signal) divided by the AM envelope $1+(A+B)$ $$\left(\text{i.e. } \frac{(A-B)}{1+(A+B)}\right)$$

is used concurrently to angle modulate the carrier wave. In other words, the amplitude of the $(A-B)$ waveform is modified in accordance with the inverse of the envelope of the amplitude modulated carrier, and the resultant is applied to the angle modulator as the angle modulating signal.

The present invention discloses a novel arrangement for obtaining the $$\frac{(A-B)}{1+(A+B)}$$

signal from the $(A+B)$ and $(A-B)$ signals.

In accordance with the invention, a constant current source of $(A+B)$ signals and a constant current source of radio frequency waves are coupled to a rectifier device characterized by a current/voltage relationship of the form $I=A'(e^{\alpha V}-1)$ where A' and $\alpha$ are temperature dependent constants. An audio current, of a magnitude equal to $I/A'$, from the $(A+B)$ signal source and a smaller RF current, ΔI, from the wave source are caused to flow through the device. The resultant voltage change across the device, or ΔV, is proportional to $$\frac{\Delta I}{I/A'+1}$$

Accordingly the RF voltage wave developed across the rectifier (ΔV) is amplitude modulated with $$\frac{1}{1+(A+B)}$$

In one embodiment of the invention the envelope of the RF voltage wave developed across the rectifier is detected to provide the $$\frac{1}{1+(A+B)}$$

signal, and the detected signal is combined with the $(A-B)$ signal in a balanced modulator to develop the $$\frac{(A-B)}{1+(A+B)}$$

signal at the modulator output. In another embodiment the RF waves (ΔI) caused to flow through the rectifier are first angle modulated by the $(A-B)$ signal so that the RF voltage wave (ΔV) developed across the rectifier is angle modulated by (A—B) and amplitude modulated by $$\frac{1}{1+(A+B)}$$

This RF voltage wave is impressed upon the input of a balanced angle modulation detector and the detector output is the $$\frac{(A-B)}{1+(A+B)}$$

signal.

The invention may be better understood however with reference to accompanying figures and the detailed explanation of the operation of apparatus shown therein.

FIGURE 1 is a schematic, partly in block form, which illustrates how the $(A+B)$ and $(A-B)$ signals are processed in a system for generating and radiating a carrier wave amplitude modulated by the $(A+B)$ signal and concurrently angle modulated by a signal of the form $$\frac{(A-B)}{1+(A+B)}$$

derived from the $(A+B)$ and $(A-B)$ signals.

FIGURE 2 is a detailed schematic of apparatus for generating the signal $$\frac{(A-B)}{1+(A+B)}$$

from input signals $(A+B)$ and $(A-B)$.

Figures 1, 2:
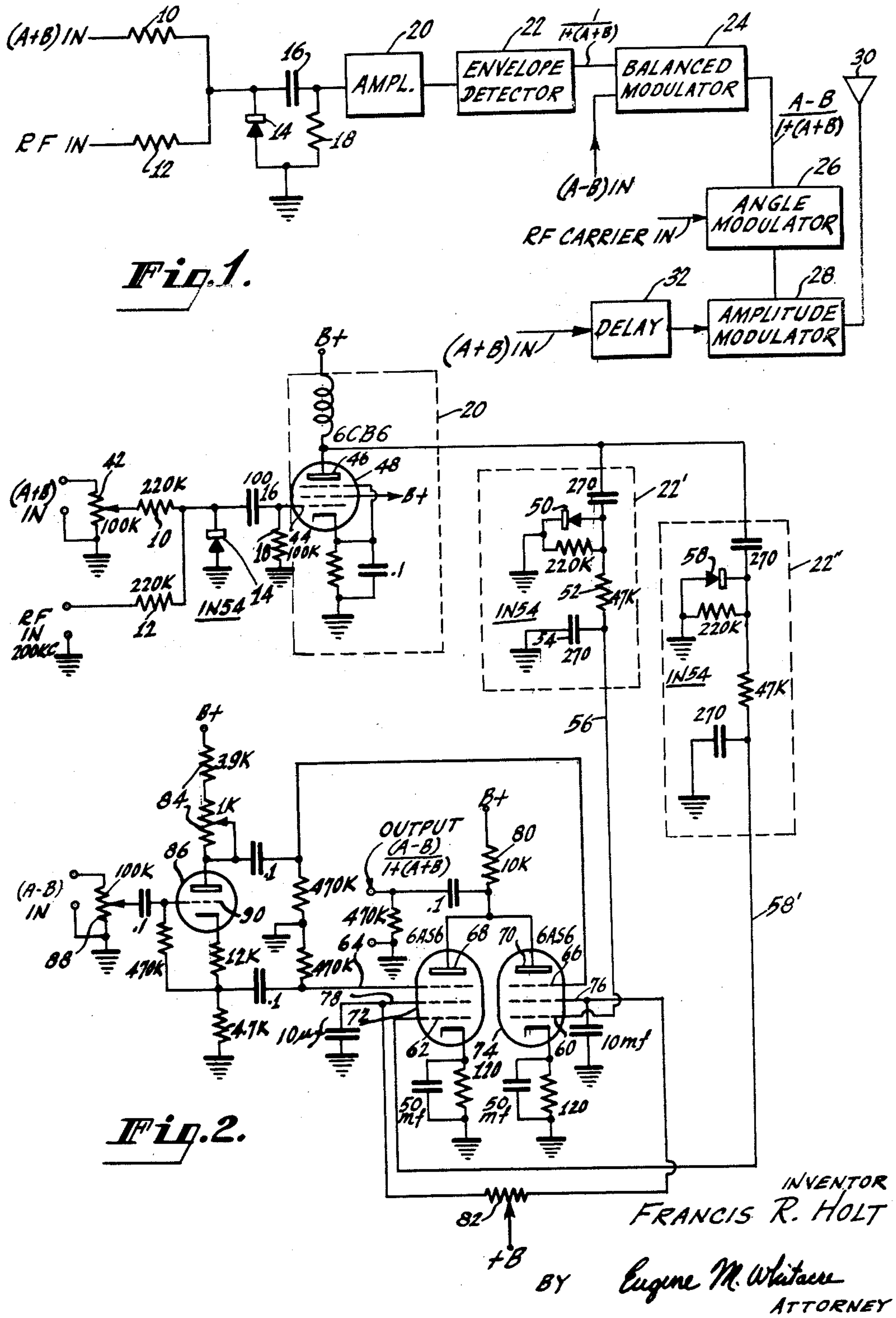

Referring to FIGURE 1, a source of audio signal $(A+B)$ and a radio frequency (RF) wave source are coupled to a rectifier device 14 through resistors 10 and 12. The device 14 is a semiconductor diode which has a current/voltage characteristic of the form given by Equation 1. As previously explained, the current/voltage characteristic of the diode 14 is defined by $$I=A'(e^{\alpha V}-1) \quad (1)$$

where A' and $\alpha$ are temperature dependent constants, I is the current through the device, V is the voltage across the device, and $e$ is the base of natural logarithms. The derivation of Equation 1 may be found in Handbook of Semiconductor Electronics, First Edition, McGraw-Hill, pages 3–11 to 3–13. An audio frequency current, of a magnitude equal to $I/A'$, from the $(A+B)$ source and a smaller RF current, $\Delta I$, from the RF wave source are caused to flow through the diode 14. If Equation 1 is differentiated with respect to V $$\frac{dI}{dV}=\alpha(I+A') \quad (2)$$

simplifying (2)

$$\alpha\Delta V=\frac{\Delta I}{I+A'} \quad (3)$$

$$\alpha A'\Delta V=\frac{\Delta I}{\frac{I}{A'}+1} \quad (4)$$

or, more simply $\Delta V$ is proportional to $$\frac{\Delta I}{I/A'+1} \quad (5)$$

The ohmic values of resistors 10 and 12 are chosen to be very large compared to the forward resistance of the diode 14. Alternatively the resistors may be dispensed with if the internal impedances of the audio and RF sources are very large, i.e. constant current sources. The voltage V (the $(A+B)$ voltage) corresponding to the maximum forward current through the diode is at room temperature=0.018 volts. The RF voltage ΔV, Equation 5, developed across the diode should be small compared with this; a value of 4 millivolts peak-to-peak when $I=0$, that is when $(A+B)=0$, has, for example, been found suitable.

Accordingly the RF current ΔI, Equation 5, is provided by the RF source and the relatively lower frequency current I is supplied by the $(A+B)$ source. The RF source frequency is chosen to be sufficiently higher than the $(A+B)$ signal so that ΔV may be readily separated from V.

The voltage wave across the diode 14 includes ΔV (RF containing envelope modulation proportional to $$\left.\frac{1}{1+(A+B)}\right)$$

and the lower frequency wave $(A+B)$ and its harmonic. A capacitor 16 and resistor 18 serve as a high pass filter so that the signal impressed upon RF amplifier 20 is ΔV. The amplified wave ΔV at the output of amplifier 20 is impressed upon an envelope detector 22 to provide at its output a signal proportional to $$\frac{1}{1+(A+B)}$$

This signal and a second signal, $(A-B)$, are then supplied to the inputs of a balanced modulator 24 to provide the desired signal $$\frac{(A-B)}{1+(A+B)}$$

at the output of the modulator 24. An RF carrier at the desired output frequency of the transmitter is angle modulated in angle modulator 26 by the $$\frac{(A-B)}{1+(A+B)}$$

signal. The angle modulated wave is then amplitude modulated by a delayed $(A+B)$ signal in the modulator 28 and the resultant amplitude and angle modulated carrier wave is radiated by antenna 30. The delay apparatus 32 is designed to delay the amplitude modulating $(A+B)$ signal with respect to the $(A+B)$ signal coupled to diode 14 by resistor 10 so that the radiated angle and amplitude modulation components have corresponding phases. Alternatively, the delay provided by delay apparatus 32 may be chosen to provide the correct delay for a standardized receiver circuit for the reception and reproduction of the stereophonic signals $(A+B)$ and $(A-B)$. The latter is advantageous because the transmitted signal may be adapted to be processed by a single detector circuit.

Referring now to FIGURE 2 there is shown one actual detailed circuit used to generate the modulating signal $$\frac{(A-B)}{1+(A+B)}$$

Because the circuit follows closely the arrangement of FIGURE 1, corresponding elements and components are designated by the same numerals. The diode 14 is coupled to a 200 kc. RF source through the resistor 12. The $(A+B)$ signal is coupled to the rectifier through the resistor 10 from the adjustable tap of potentiometer 42. The 200 kc. wave which is envelope modulated by $$\frac{1}{1+(A+B)}$$

in the manner described in connection with FIGURE 1, is developed across the resistor 18 and is supplied to the grid 44 of amplifier tube 48. The $(A+B)$ wave also developed across diode 14 is not impressed upon grid 44 because it appears across condenser 16 rather than across resistor 18.

The amplified amplitude modulated carrier wave appearing at the anode 46 of tube 48 is supplied to a pair of envelope detectors 22' and 22''. Note that the rectifier 50 of detector 22' is connected in circuit to provide a negatively-going output signal with respect to ground. In other words if $(A+B)$ is sinusoidal in shape, the cusps of the output signal on lead 56 are the negative peaks. The low pass filter or integrator comprised of resistor 52 and capacitor 54 serve to remove the RF components and pass the relatively low frequency envelope variations to the control grid 60 of a first modulator tube 74. Note that the D.C. component of the modulated wave is also supplied to grid 60. In a similar manner the envelope detector 22'' having rectifier 58 connected in circuit to provide a positively-going output signal, impresses, by way of lead 58', upon the control grid 62 of a second modulator tube 72 a signal with the cusps as the positive peaks and with the D.C. component present. Note that the signal supplied to 62 by lead 58' is equal in amplitude and 180° out of phase with respect to the signal supplied to grid 60 by lead 56. Likewise the supplied D.C. components are of opposite polarity but of equal amplitude.

As a carrier wave is amplitude modulated by a sinusoidal signal the average envelope level is unchanged when the percentage of modulation is altered. In other words the envelope increase during the peaks of modulation is exactly compensated by the envelope decrease during the troughs. Accordingly with sinusoidal signal amplitude modulation, the D.C. component does not change as a function of the amount of modulation (provided of course the modulation does not exceed 100%). On the other hand when a carrier is amplitude modulated by the function $$\frac{1}{1+\sin \omega t}$$

the envelope increase during the peaks (i.e. the cusps) is not equal to the envelope decrease during the troughs of modulation and accordingly the average envelope levels changes as a function of the percentage of modulation. Accordingly the D.C. component, which is a measure of the average envelope level, varies with the percentage modulation.

The $(A-B)$ signal is impressed upon the control grid 90 of a phase splitter tube 86 by way of adjustable potentiometer 88. The tube 86 is arranged to provide equal amplitude and opposite phase output signals to the third grids 64 and 66 of the modulator tubes 72 and 74 in a well known manner. A portion of the anode load resistance 84 of the phase splitter tube 86 is made adjustable to permit control of the amplitude of the signal supplied to the third grid 66 of the modulator tube 74 so that it is equal to that supplied to the third grid 64 of the modulator tube 72.

Thus, the $(A-B)$ signal is supplied to the third grid 64, and the $$\frac{1}{1+(A+B)}$$

along with the positive D.C. component is supplied to the control grid 62 of the modulator tube 72. The $-(A-B)$ signal (or inverted $(A-B)$ signal) is supplied to the third grid 66 and the $$-\frac{1}{1+(A+B)}$$

along with the negative D.C. component is supplied to the control grid 60 of tube 74.

The anode 68 of tube 72 and the anode 70 of tube 74 are connected together and to a source of operating potential B+, through a load resistor 80. The screen grid 78 of tube 72 and screen grid 76 of tube 74 are bypassed to ground and connected to opposite end terminals of balance potentiometer 82, whose adjustable tap is connected to the source of operating potential B+. The cathodes of tubes 72 and 74 are connected to ground through conventional individual bias resistors each suitably bypassed by capacitors. The modulator is adjusted by reducing the $(A-B)$ signal input to zero, applying the $(A+B)$ and RF signals and adjusting the tap on potentiometer 82 for minimum output across 80. Then the $(A+B)$ signal is removed, as is the RF source input, the $(A-B)$ signal is applied and the resistor 84 is adjusted to provide minimum developed output across 80.

When the apparatus of FIGURE 2 is used in the system illustrated in FIGURE 1 the setup adjustments are as follows. After the angle modulator is adjusted, identical A and B signals are used to make $(A-B)$ equal zero and $(A+B)$ equal 2A. The $(A+B)$ input to the amplitude modulator is adjusted for the desired maximum modulation (say 97%). The angle modulation is zero because $(A-B)$ is zero. Then equal amplitude anti-phased A and B signals are used i.e. $A=-B$. For this condition $(A-B)=2A$ and $(A+B)=0$ and the $(A-B)$ signal level is adjusted by potentiometer 88 to provide the maximum desired angle modulation for the system. Finally no B is used and an A signal only is fed to potentiometer 42, which is adjusted to provide zero output from the B channel on the monitor. The monitor is provided with an angle demodulator which provides an output $(A-B)\cdot[1+(A+B)]$ i.e. product of angle modulation and the envelope modulation on the angle modulated wave. Accordingly, the correct adjustment of the apparatus of FIGURE 2 causes the output of the monitor angle demodulator to be $(A-B)$. This output is matrixed in the monitor with the monitor AM channel output $(A+B)$ to recreate the A and B signals. The described adjustment of potentiometer 42 that provides zero output from the monitor B channel furnishes the required amplitude of the denominator term $1+(A+B)$, to match the amplitude of numerator term $(A-B)$ which was determined when $A=-B$.

Figure 3:
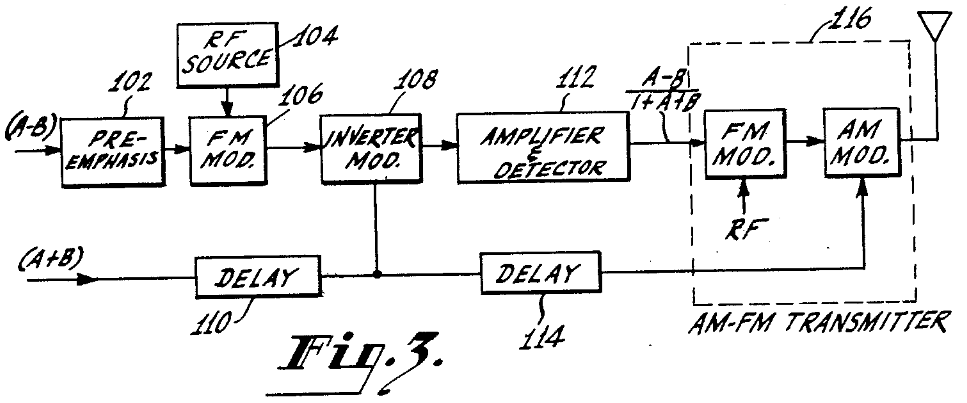
FIGURE 3 is a block diagram of a complete transmitter illustrative of another embodiment of the invention.

Referring now to FIGURE 3, there is shown in block form a transmitter wherein the $$\frac{(A-B)}{1+(A+B)}$$

angle modulating signal is generated in accordance with the invention in a less complicated manner than in the embodiments shown in FIGURES 1 and 2.

While in the previously described embodiments the RF wave coupled to the diode is of fixed frequency, in FIGURE 3 the RF wave which provides the ΔI current is an RF wave which has been frequency modulated by the $(A-B)$ signal. Accordingly the RF voltage wave ΔV developed across the diode 14 is frequently modulated by $(A-B)$ and is envelope modulated by $$\frac{1}{1+(A+B)}$$

By impressing this wave upon the input of a balanced FM detector of the type disclosed for example in U.S. Patent 2,121,103, the detected output is $$\frac{(A-B)}{1+(A+B)}$$

The $(A-B)$ signal is first pre-emphasized and the resultant audio signal is caused to frequency modulate an RF wave of a frequency sufficiently removed (higher) from the frequency range of the modulating signals A and B to permit separation of the RF wave from the $(A+B)$ signal developed across the diode modulator.

In FIGURE 3 the $(A-B)$ signal is impressed upon the pre-emphasis network 102 which may be of the double time constant type as described in a filed application for Avins and Holt on November 5, 1959, Serial No. 851,041, and entitled "Stereophonic Sound Signalling System," now abandoned. An RF source 104 and the output signal from the network 102 are supplied to an FM modulator 106. The output of the modulator 106 is supplied to an inverter modulator 108 and is an RF voltage wave which is frequency modulated by a pre-emphasized $(A-B)$ signal. The inverter modulator 108 includes the diode circuit previously described in conjunction with FIGURES 1 and 2. The $(A+B)$ signal is supplied to the inverter modulator 108 via the delay network 110 and serves as the I current previously described. The small RF voltage wave frequency modulated by the pre-emphasized $(A-B)$ signal serves to furnish the ΔI current. The developed ΔV RF wave at the output of the inverter modulator 108 accordingly is frequency modulated by a function of $(A-B)$ and concurrently envelope modulated by $$\frac{1}{1+(A+B)}$$

This output signal is, in amplifier and detector 112, amplified and impressed upon the input of a balanced FM detector whose output is the product of the frequency modulation times the amplitude modulation i.e. the desired modulating signal $$\frac{(A-B)}{1+(A+B)}$$

The AM-FM transmitter 116 may be a standard conventional AM broadcast transmitter having the crystal oscillator stage replaced by a FM signal generator having the same output frequency (unmodulated) and power as the original oscillator stage. The $$\frac{(A-B)}{1+(A+B)}$$

signal modulates the FM generator. The delayed $(A+B)$ signal supplied to the inverter modulator 108 is impressed upon the amplitude modulator of transmitter 116 via the delay network 114. The delay provided by network 110 compensates for the delay on the $(A-B)$ signal caused by the modulation process in modulator 106 and any delay required for a typical receiver. The delay provided by network 114 is to compensate for the delay in the discriminator 112 and the FM modulator in transmitter 116.

Figure 4:
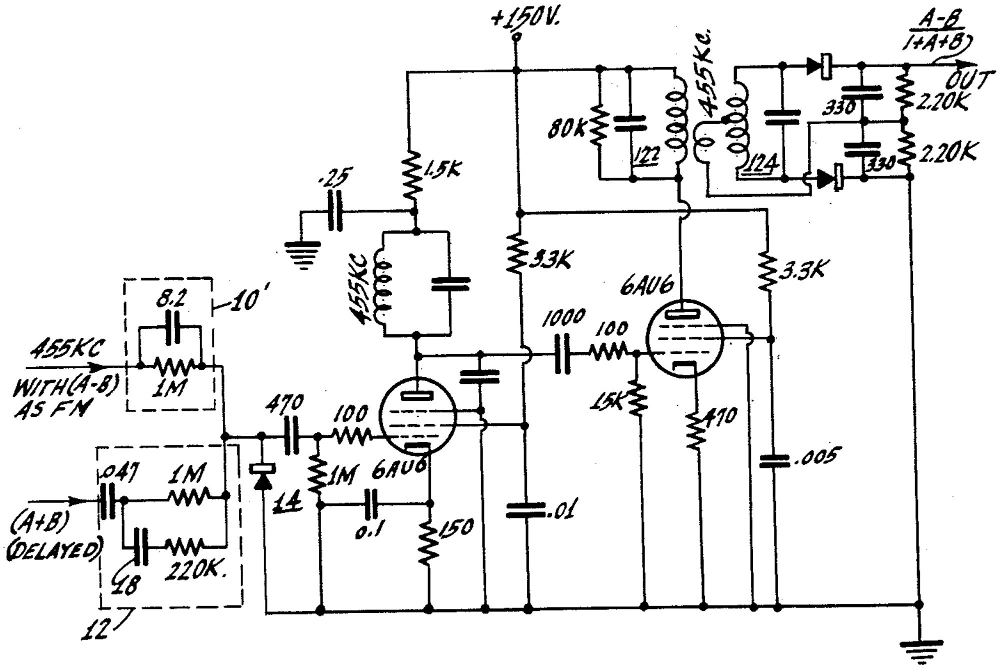
FIGURE 4 is a schematic of a portion of the apparatus shown in block form in FIGURE 3.

FIGURE 4 is a detailed schematic illustrative of the apparatus shown in blocks 108 and 112 in FIGURE 3.

As previously described, the RF current source (center frequency 455 kc.) is frequency modulated by a pre-emphasized $(A-B)$ signal and coupled to the diode 14 by the network 10'. The source is of relatively low output impedance and includes a D.C. return path to ground (not shown). A small capacitor (8.2 μμf.) in network 10' is shunted across the 1 megohm resistor and the combination serves to provide a D.C. return for the diode 14 and to cause the small ΔI current flow through diode 14. The delayed $(A+B)$ signal is coupled to the diode 14 by the network 12'. The .047 capacitor blocks the D.C. but passes the $(A+B)$ signal. The I current supplied by $(A+B)$ flows through the 1 megohm resistor and through the diode 14. The 18 μμf. capacitor and 220K resistor shunting the 1 megohm resistor serve to compensate for the inherent shunt circuit capacity from the junction of the 1 megohm resistor and the cathode of diode 14 to ground which would attenuate the current at the higher $(A+B)$ frequencies flowing through diode 14 and cause a roll off of I current at the higher modulating frequencies. The shunt resistance-capacitance network provides a second path through which sufficient additional current flows from the $(A+B)$ source for the higher $(A+B)$ frequencies to provide a constant I current to flow through the diode 14 regardless of the frequency of $(A+B)$.

The ΔV developed across the diode 14 is amplified and impressed upon the balanced FM discriminator primary circuit 122. It is not considered necessary to describe the two stage 455 kc. bandpass amplifier which is entirely conventional in design. It will be observed that the means for coupling $\Delta V$ from the diode to the amplifier is chosen to pass the RF wave but not the $(A+B)$ signal as previously described. The frequency/amplitude characteristic of the bandpass amplifier is such that the 455 kc. carrier and the modulation sidebands (AM and FM) are passed substantially without attenuation. A bandpass of 455 kc.$\pm$15 kc. is adequate when the highest A and B modulating frequency is 7500 c.p.s. The discriminator and detector is of conventional design. The secondary 124 resonant frequency is adjusted to 455 kc. and the detector is linear for $\pm$15 kc. The detector output is the $$\frac{(A-B)}{1+(A+B)}$$

signal i.e. the frequency modulation times the envelope modulation. Note that if $A=B$, the 455 kc. source contains no frequency modulation and even though the $\Delta V$ 455 kc. RF voltage wave is envelope modulated by $$\frac{1}{1+2A}$$

the FM detector output is zero because amplitude variations at center frequency are balanced out. Note also that when $B=-A$, the envelope modulation on $\Delta V$ (455 kc.$\pm A$ c.p.s. RF voltage wave) developed across diode 14 is zero, and accordingly the detector output is proportional to 2A.

In the specifications and figures particular values for certain circuit elements and components and certain source frequencies are shown by way of illustration. These values are not critical and are subject to wide variation; accordingly the circuits should be considered as illustrative of and not construed as limiting the invention.

What is claimed is:

1. A modulator comprising in combination, a solid state diode device characterized by a voltage current relationship substantially of the form $I=A'(e^{\alpha V}-1)$ where I represents the current flowing through the device, A' and $\alpha$ are temperature dependent constants, V represents the voltage developed across the device and $e$ is the base of natural logarithms, a source of signals, a source of carrier waves, means coupling said sources to said device through resistances having ohmic values which are large compared to the forward resistance of said diode for establishing a signal current flow and a relatively smaller wave current flow through the device and developing a voltage wave across the device that includes components corresponding to the signals, the carrier waves, and intermodulation products thereof, an output utilization circuit for the carrier waves and intermodulation products components for deriving an output wave proportional to the reciprocal of the sum of said signals and a constant, and coupling means between said device and said output utilization circuit for said carrier waves and intermodulation products but ineffectual to couple said signals.

2. A modulator comprising in combination, a device characterized by a voltage current relationship substantially of the form $I=A'(e^{\alpha V}-1)$ where I represents the current flowing through the device, A' and $\alpha$ are temperature dependent constants, V represents the voltage developed across the device and $e$ is the base of natural logarithms, a source of signals, a source of waves, means coupling said source of signals to said device to set up a flow of signal current through the device, means including resistance having an ohmic value which is large compared to the forward resistance of said device coupling said source of waves to said device to set up a flow of wave current through the device of amplitude that is a fraction of the amplitude of the said signal current flowing therethrough, and an output circuit responsive to the voltage developed across the device for deriving an output wave proportional to the reciprocal of the sum of said signals and a constant.

3. Apparatus for generating a signal proportional to $$\frac{1}{1+X}$$

from an input signal X comprising in combination, a source of signal X, a source of radio frequency waves, a solid state diode device, means coupling said sources to said device, a resistor-condenser series circuit connected in shunt with said diode device, the time constant of the series circuit being long compared to the waves and short compared to the signal X, and an envelope detector responsive to the voltage developed across the resistor for providing an output signal proportional to $$\frac{1}{1+X}$$

4. In a modulator for a transmitter, a source of audio signals $(A+B)$, a source of superaudible waves, a solid state diode, means coupling said sources to said diode for setting up a flow of $(A+B)$ signal current and a relatively lower amplitude wave current through the diode and developing a voltage wave of the frequency of the superaudible waves envelope modulated in proportion to the function $$\frac{1}{1+(A+B)}$$

and an envelope detector means coupled to the diode and responsive to the modulated wave developed across the diode to provide at its output a signal corresponding to the modulation of said waves.

5. In a modulator for a transmitter, a source of audio signals $(A+B)$, a source of superaudible waves, a solid state diode, means coupling said sources to said diode for setting up a flow of $(A+B)$ signal current and a relatively lower amplitude wave current through the diode to develop a voltage wave of the frequency of the superaudible waves envelope modulated in proportion to the function $$\frac{1}{1+(A+B)}$$

an envelope detector means responsive to the modulated wave developed across the diode to provide at its output a signal corresponding to the modulation of said waves, a balanced modulator, a second source of audio signals $(A-B)$, and means for coupling said second source and the envelope detector output to said modulator for developing the signal $$\frac{(A-B)}{1+(A+B)}$$

at the modulator output.

6. A signal generator comprising in combination, a source of $(A-B)$ audio signals, a source of $(A+B)$ audio signals, a source of a radio frequency carrier wave, means for frequency modulating the carrier wave by the $(A-B)$ signal, a solid state diode device, means coupling said frequency modulated wave and said source of $(A+B)$ signals to said device, a balanced frequency modulation detector coupled to said device including an output circuit for developing a signal proportional to $$\frac{(A-B)}{1+(A+B)}$$

thereacross.

7. In a transmitter for deriving a wave amplitude modulated by an $(A+B)$ audio signal and frequency modulated by a signal proportional to $$\frac{(A-B)}{1+(A+B)}$$

where A and B are related audio signals, a source of a carrier wave; means for frequency modulating said source by an $(A-B)$ audio signal; an inverter modulator including a device having a current/voltage characteristic of the form $I=A'(e^{\alpha V}-1)$ where V represents the voltage impressed across the device, $\alpha$ and A' are constants, $e$ is the base of natural logarithms, and I is the resultant current flowing through the device; a source of $(A-B)$ signals; means coupling said carrier wave frequency modulated by said audio signal and said source of $(A+B)$ signals to said inverter modulator; a balanced frequency modulation detector having an input circuit and an output circuit, means coupling said input circuit to said inverter modulator, and means coupling the detector output circuit to a transmitter to frequency modulate the transmitter proportional to the signal $$\frac{(A-B)}{1+(A+B)}$$

8. A signal generator comprising in combination, a source of $(A-B)$ audio signals, a source of $(A+B)$ signals, a source of a radio frequency carrier wave, means for frequency modulating the carrier wave by the $(A-B)$ signal, a solid state diode device, means coupling said frequency modulated wave and said source of $(A+B)$ signals to said device, a detector of the type responsive to the product of the frequency modulation times the envelope modulation on a wave supplied to its input circuit, means coupling the detector input circuit to the device, and a detector output circuit for developing a signal proportional to $$\frac{(A-B)}{1+(A+B)}$$

thereacross.

9. In a stereophonic broadcasting system comprising a source of stereophonically related audio frequency signals and a high frequency wave, means for applying said high frequency wave and at least one of said stereophonically related audio frequency signals to a device through resistance having an ohmic value which is large compared to the forward resistance of said device, said device being characterized by a current voltage relationship substantially of the form $I=A'(e^{\alpha V}-1)$ wherein I represents the current flowing through the device, A' and $\alpha$ are temperature dependent constants, V represents the voltage developed across the device and $e$ is the base of natural logarithms, means coupled to said device for developing an output wave proportional to the reciprocal of the sum of said one of said stereophonically related audio frequency signals and a constant.

References Cited in the file of this patent

UNITED STATES PATENTS

| | | |
|---|---|---|
| 2,242,791 | Ohl | May 20, 1941 |
| 2,698,379 | Boelens et al. | Dec. 28, 1954 |
| 2,761,105 | Crosby | Aug. 28, 1956 |

OTHER REFERENCES

Compatible Stereo Radio Using AM-FM Multiplex Electronics, May 8, 1959.